United States Patent [19]
Matsuda

[11] Patent Number: 5,823,687
[45] Date of Patent: Oct. 20, 1998

[54] ROLLING BEARING WITH ALIGNING RING

[75] Inventor: Shinya Matsuda, Yao, Japan

[73] Assignee: Koyo Seiko Co., Ltd., Chuo-ku, Japan

[21] Appl. No.: 822,502

[22] Filed: Mar. 24, 1997

[30]     Foreign Application Priority Data

Mar. 25, 1996  [JP]  Japan ................................ 8-096296

[51] Int. Cl.$^6$ .................................................. F16C 19/28
[52] U.S. Cl. ......................... 384/558; 384/208; 384/625
[58] Field of Search ................................... 384/558, 498, 384/209, 210, 208, 625

[56]              References Cited

U.S. PATENT DOCUMENTS

| | | |
|---|---|---|
| 1,281,205 | 10/1918 | Pruyn ........................................ 384/498 |
| 3,476,454 | 11/1969 | Markey . |
| 3,807,819 | 4/1974 | Zimmer et al. . |
| 3,891,286 | 6/1975 | Zimmer et al. . |
| 3,981,550 | 9/1976 | Zimmer et al. ........................... 384/558 |
| 4,668,110 | 5/1987 | Egeto et al. ............................... 384/498 |

*Primary Examiner*—Lenard A. Footland
*Attorney, Agent, or Firm*—Reid & Priest LLP

[57]              ABSTRACT

In a rolling bearing with aligning ring (A) in which rollers (3) serving as rolling elements are interposed between an inner ring (1) and an outer ring (2) having on its outer periphery a spherical portion (21) and in which an aligning ring (4) is fitted on a spherical portion (21) of the outer ring (2), the aligning ring (4) is composed of two members separable along a plane perpendicular to an axis of the aligning ring (4) at the center portion in the axial direction thereof.

2 Claims, 4 Drawing Sheets

ROLLING BEARING WITH ALIGNING RING

BACKGROUND OF THE INVENTION

The present invention relates to a rolling bearing with aligning ring.

As bearings such as ones for rotatably supporting both ends of a pressure roll in a rolling mill, rolling bearings with aligning ring are used for aligning an axis of the pressure roll with respective axes of the rolling bearings disposed at both ends of the pressure roll. In such a rolling bearing with aligning ring, a spherical portion projecting outwardly is formed on an outer periphery of an outer ring. A spherical portion formed on an inner periphery of the aligning ring is fitted to the spherical portion of the outer ring, thereby to support the outer ring so that the axis thereof will be aligned with the axis of the pressure roll.

FIG. 4 is a perspective view showing the rolling bearing as mentioned above. In FIG. 4, a pair of guide slots 91 are formed at opposite positions to each other in the inner periphery of the aligning ring 90 so that the outer ring 92 can be assembled with the aligning ring 90 through these guide slots 91. The guide slots 91 extend from one end 91a of the aligning ring 90 toward intermediate positions in the axial direction of the aligning ring 90.

To incorporate the outer ring 92 in the aligning ring 90, the axis of the outer ring 92 is hold to be perpendicular to the axis of the aligning ring 90, and a spherical portion 92a of the outer periphery of the outer ring 92 is inserted into the guide slots 91. After completion of the insertion, the outer ring 92 is rotated by an angle of 90° to have the axis of the outer ring 92 in concentric arrangement with the axis of the aligning ring 90.

In the above-mentioned rolling bearing with aligning ring, however, when a large load is applied to the guide slot 91 in the aligning ring 90, the aligning ring 90 may be broken because of a crack originating from the guide slot 91. It is therefore required to assemble the rolling bearing with a machine so as not to locate any of the guide slots 91 in a load-receiving position of the rolling bearing. However, a position where the load is applied to the aligning ring 90 may be changed dependent on operational conditions, e.g., in case the inner ring is used as a stationary ring with the outer ring 92 used as a rotary ring. In that case, the load may be applied to the guide slots 91, thereby causing a break of the aligning ring 90. Thus, the rolling bearing with aligning ring of the prior art has no practical use for the large load.

Even in case where a position to which a load is applied is not changed in the aligning ring 90, after the use in a predetermined period of time the outer ring 92 is to be rotated together with the aligning ring 90, thereby to shift the position to which the load is applied in the outer ring 92. This enables the rolling bearing to be used again. In that case, however, the aligning ring 90 is required to be rotated by an angle of 180° in order to avoid applying the load to the guide slot 91. Since this change of the load-receiving position is permitted only once, it is still limited that a lifetime of the bearing is effectively elongated.

Further, to incorporate or remove the outer ring into or from the aligning ring, it is required to rotate the outer ring around a diametrical imaginary line across the guide slots 91 so that the axis of the outer ring 92 will be disposed perpendicular to the axis of the aligning ring 90. Since this attachment/removal is a difficult work, it takes a long time to carry out the maintenance such as disassembling, inspection or the like.

As another aligning ring, there has been proposed an aligning ring in which a part of the circumference thereof is split by pressing, to enable the inner diameter of the aligning ring to be enlarged. For instance, this is disclosed in Japanese unexamined Utility Model publication No. Hei 6-32736. According to the aligning ring disclosed in the publication, the outer ring can be assembled into the aligning ring by enlarging an inner diameter of the aligning ring. However, in a large-sized aligning ring of this type, a load required for splitting its outer periphery is excessively high, thus preventing the precise split of the outer periphery. Accordingly, there remains a problem that the aligning ring in which a split is made in its circumferential part can not be applied to a large-size bearing.

OBJECT AND SUMMARY OF THE INVENTION

It is an object of the present invention to offer a rolling bearing with aligning ring which can be used without any inconvenience even under the operational condition where a position to which a load is applied is changed in the aligning ring.

It is another object of the present invention to offer a rolling bearing with aligning ring capable of further extending its lifetime.

It is a further object of the present invention to offer a rolling bearing with aligning ring which is easy to maintain.

It is still another object of the present invention to offer a rolling bearing with aligning ring which can be applied to a large-sized bearing.

A rolling bearing A with aligning ring according to the present invention comprises: an inner ring; an outer ring having a spherical portion on an outer periphery thereof; rolling elements interposed between the inner ring and the outer ring; and an aligning ring fitted to the spherical portion of the outer ring to relatively support the outer ring rotatable around a center of sphere of the spherical portion, the aligning ring being composed of two members separable along an imaginary plane perpendicular to an axial direction of the aligning ring at a center position in the axial direction.

According to the rolling bearing with aligning ring of the present invention, the aligning ring is composed of two members separable from each other along the imaginary plane perpendicular to the axial direction of the aligning ring at the center position in the axial direction. Accordingly, by fitting one and the other members forming the aligning ring to the spherical portion of the outer ring from both sides of the axial direction of the outer ring, the outer ring can be combined with the aligning ring.

According to the rolling bearing with aligning ring of the present invention, it is not required to form guide slots, through which the outer ring is to be combined with the aligning ring, in the aligning ring. Accordingly, a load can be received by the aligning ring at any position on the whole circumference thereof. This enables the rolling bearing to be used without any inconvenience even under the operational condition where a position to which a load is applied is changed in the aligning ring. Further, under the operational condition where a position to which a load is applied is not changed, it is possible to increase number of the above-mentioned positions of the outer ring as compared with the rolling bearing of the prior art. As a result, it is possible to use the rolling bearing many times by changing the position to which the load is applied, and thereby a life-time of the bearing is effectively elongated.

In the rolling bearing with aligning ring of the present invention, the outer ring can be combined with and removed from the aligning ring by bringing one and the other members forming the aligning ring face to face with each other and separating these members away from each other. This facilitates the attachment/removal of the aligning ring. Accordingly, the maintenance operation such as disassembling, inspection or the like is easy.

According to the present invention, a rolling bearing with large-sized aligning ring can easily be produced with precision. Thus, the rolling bearing with aligning ring of the present invention can suitably be applied to a large-sized rolling bearing for a pressure roll such as a double-row cylindrical roller bearing in which rollers serving as rolling elements are disposed in double rows.

DETAILED DESCRIPTION OF THE PREFERRED EMBODIMENT

Hereinafter, the present invention will be described with reference to the attached drawings showing a preferred embodiment.

Figure 1:
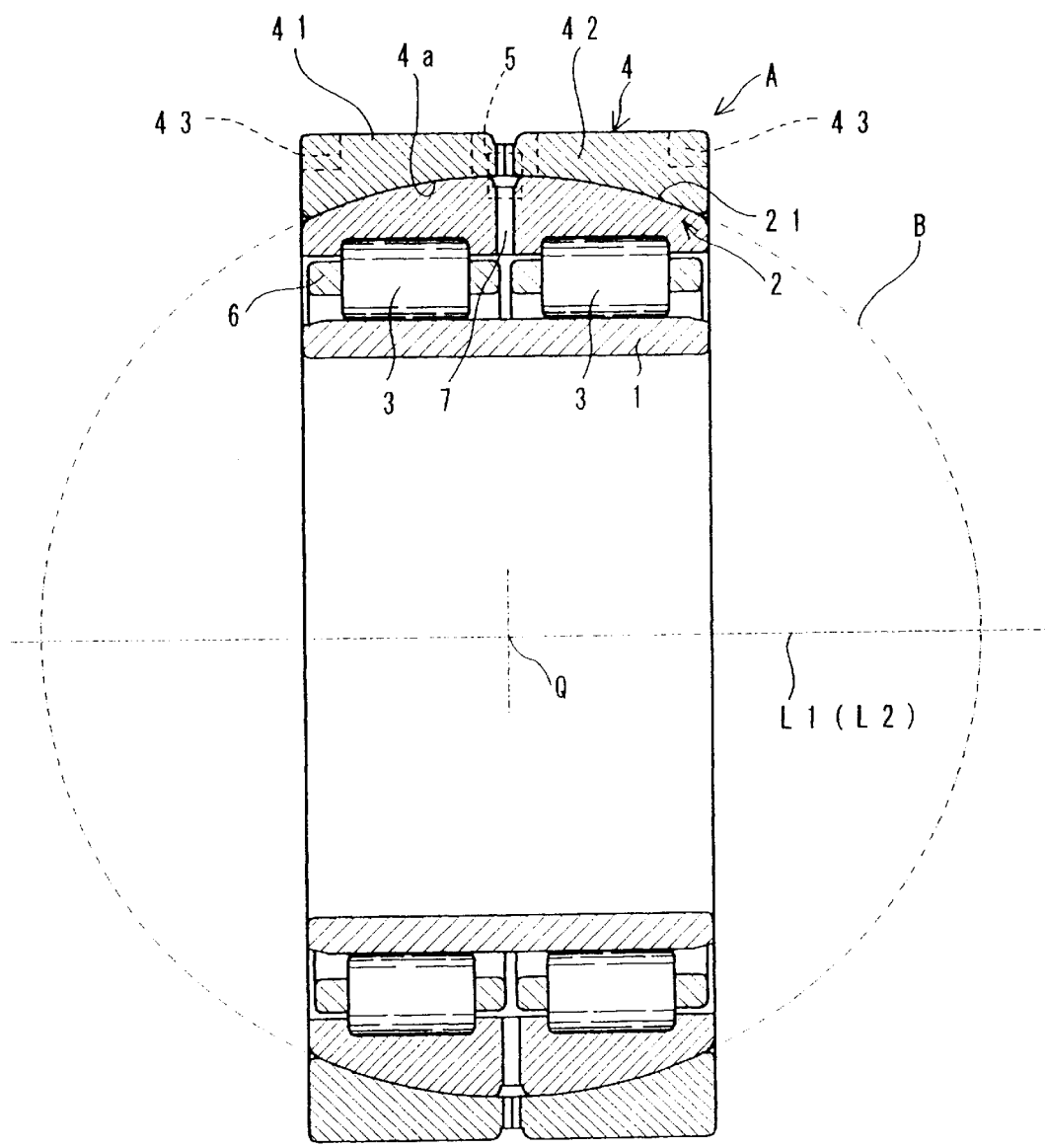
FIG. 1 is a cross-sectional view showing an embodiment of a rolling bearing with aligning ring according to the present invention.

FIG. 1 is a cross-sectional view of a rolling bearing with aligning ring in the present invention. This rolling bearing with aligning ring A is composed of an inner ring 1, an outer ring 2 having on an outer periphery thereof a spherical portion 21, rollers 3 serving as rolling elements interposed between the inner ring 1 and the outer ring 2, and an aligning ring 4 fitted on the spherical portion 21 of the outer ring 2. The rolling bearing A is a double-row cylindrical roller bearing in which the rollers 3 are disposed in double rows. This rolling bearing A is made in a large size to be used for rotatably supporting a large rolling member such as a pressure roll. The rollers 3 are held by holders 6 at every predetermined distance.

The spherical portion 21 of the outer ring 2 is formed of a portion of a sphere B whose center is equal to a center Q which is the center of axial and diametrical directions of the outer ring 2 (hereinafter is referred to as a bearing center Q). This spherical portion 21 is symmetrical with respect to an imaginary plane which includes the bearing center Q and is perpendicular to an axis L1 of the outer ring 2.

The aligning ring 4 has a width equal to that of the outer ring 2. The aligning ring 4 has on its inner periphery a spherical portion 4a fitted to an outer periphery of the outer ring 2. This spherical portion 4a is formed of a portion of the sphere B whose center is equal to the bearing center Q, and thereby the spherical portion 4a is perfectly fit on the spherical portion 21 of the outer ring 2. This spherical portion 4a is symmetrical with respect to an imaginary plane which includes the bearing center Q and is perpendicular to an axis L2 of the aligning ring 4.

Figure 2:
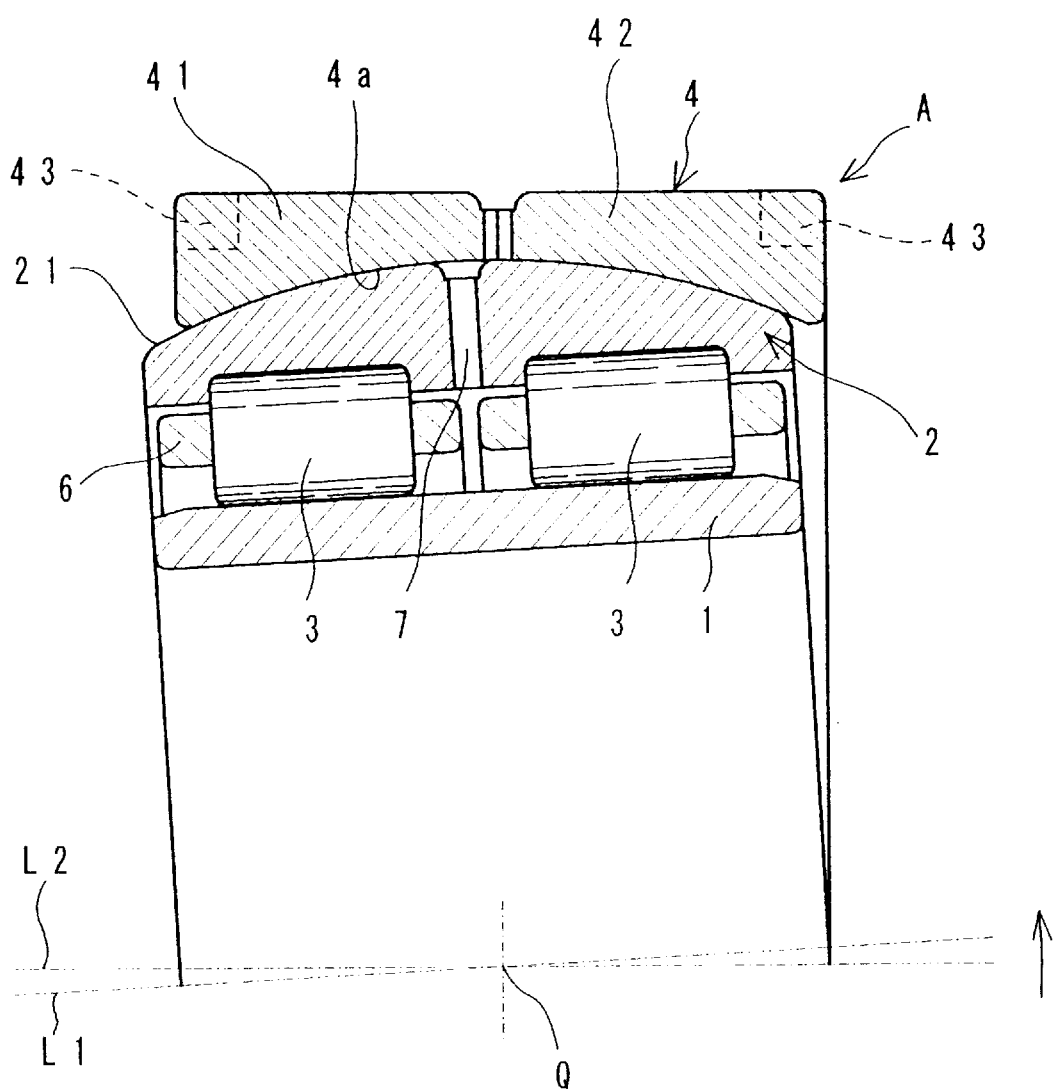
FIG. 2 is a cross-sectional view of main portions of the rolling bearing with aligning ring in FIG. 1 with an outer ring rotated with respect to an aligning ring.

The outer ring 2 and the aligning ring 4 can relatively be rotated around the bearing center Q as shown in FIG. 2. Accordingly, when the rolling bearing A is combined with, e.g., a pressure roll, the axis L1 of the outer ring 2 can always be in accord with the axis of the pressure roll. That is, the aligning ring 4 enables the axis of the outer ring 2 to be aligned with the axis of the pressure roll. Hereupon, a knock-pin 5 is mounted across both the spherical portions 4a and 21 at one position on the sphere B, and thereby the outer ring 2 and the aligning ring 4 are prevented from being rotated relatively to each other in a circumferential direction around the axis L1 of the outer ring 2. Further, an oil injection hole 7 through which a lubricant is supplied is formed in both the outer ring 2 and the aligning ring 4.

Figure 3:
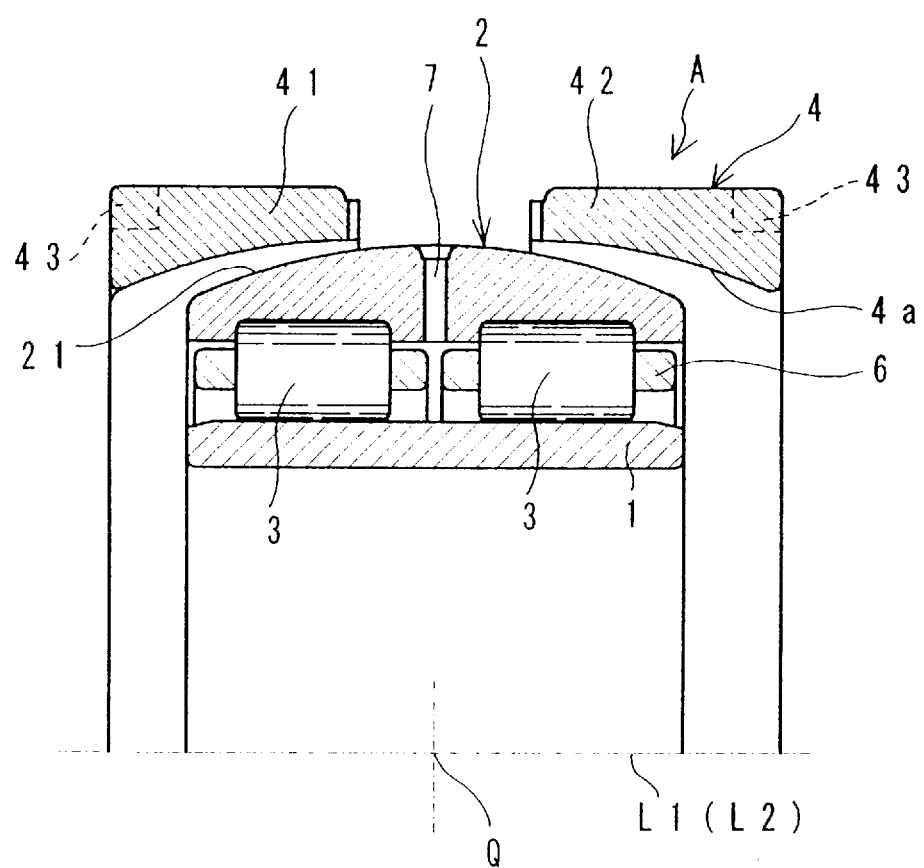
FIG. 3 is a cross-sectional view of main portions of the rolling bearing with aligning ring in FIG. 1 with the aligning ring disassembled.
Figure 4:
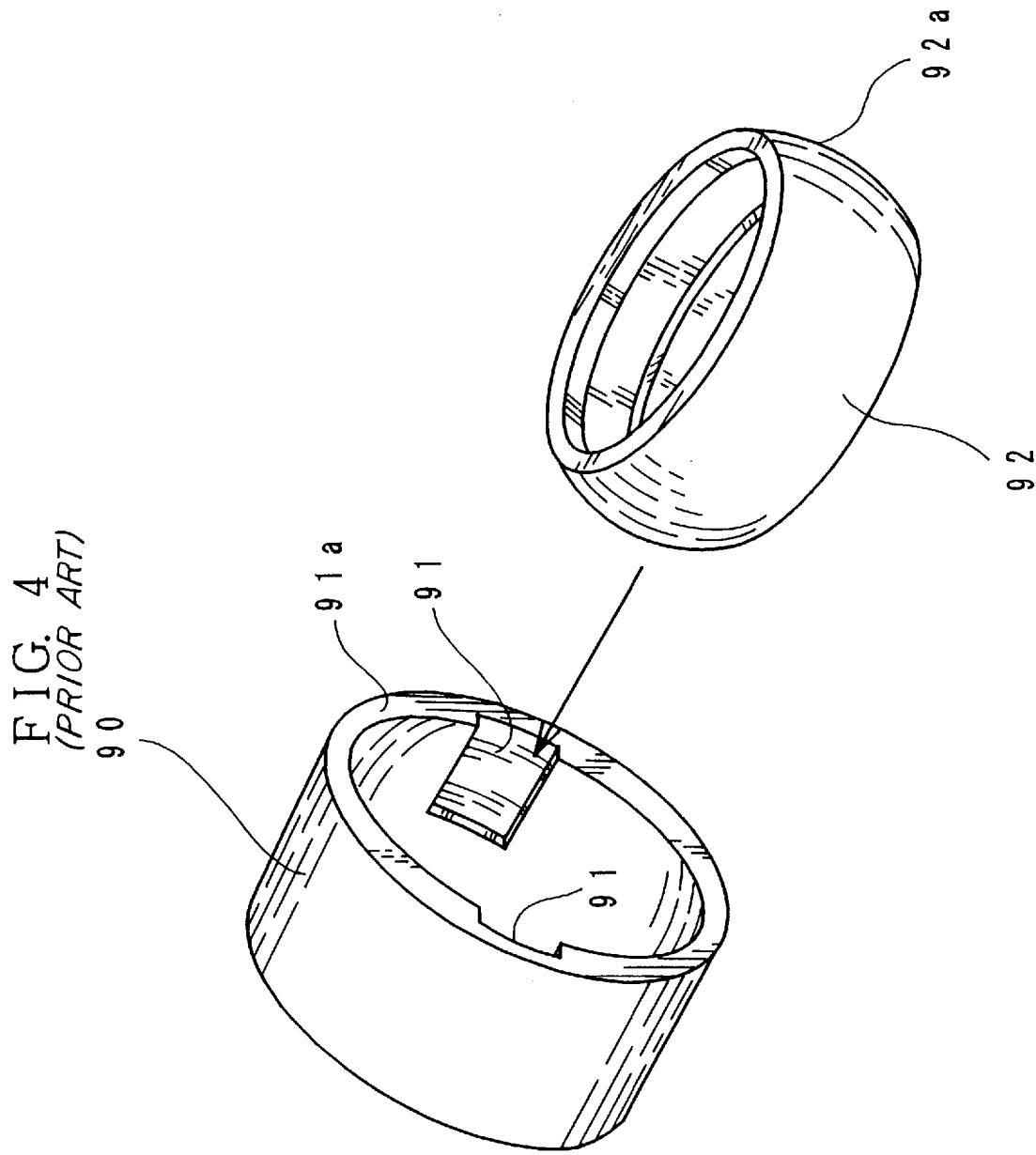
FIG. 4 is an exploded perspective view of the conventional rolling bearing with aligning ring.

The aligning ring 4 is composed of two annular members 41 and 42 and is separable along an imaginary plane perpendicular to the axis L2 of the aligning ring 4 at the center position in an axial direction of the aligning ring 4 as shown in FIG. 3. The annular members 41 and 42 forming the aligning ring 4 have the same shape, and they are symmetrically combined with each other with respect to the imaginary plane perpendicular to the axis L2. A notch 43 is formed in one end of outer periphery in each of the annular members 41 and 42, and a knock-pin (not shown) is put in the notch 43 to prevent rotation of the aligning ring 4.

In the rolling bearing with aligning ring A having the aforementioned arrangement, two separate annular members 41 and 42 are fit onto the spherical portion 21 of the outer ring 2 from both sides of the axial direction of the outer ring 2, thereby forming one aligning ring 4 in which the outer ring 2 is mounted.

In the above-mentioned rolling bearing A with aligning ring, it is not required in the aligning ring 4 to form any guide slots through which the outer ring 2 is combined with the aligning ring 4. Accordingly, a load can be received by the aligning ring 4 at any position on the whole circumference thereof. This enables the rolling bearing A to be used without any inconvenience even under the operational condition where a position to which a load is applied is changed, for example, under the operational condition where the outer ring 2 is rotated.

When the above-mentioned rolling bearing with aligning ring A is used under the operational condition where a load-acting position is not changed as in the case where the outer ring 2 is used as a stationary ring, there are only two load-receiving positions of the outer ring 2 in the conventional art, whereas load-receiving positions of the outer ring 2 can be selected from at least three positions except for a position of the knock-pin 5 in the above-mentioned embodiment. Thus, number of usage times of the rolling bearing A increases from two in the prior art to at least three. Accordingly, the life-time of the bearing can further be extended as compared with the conventional bearing.

In the above-mentioned rolling bearing with aligning ring A, the outer ring 2 can be mounted in and removed from the aligning ring 4 by merely bringing the annular members 41 and 42 face to face with each other and separating the annular members 41 and 42 away from each other. This facilitates the attachment/removal of the outer ring 2 to and from the aligning ring 4. Accordingly, the maintenance operation such as disassembling, inspection or the like is easy.

According to the above-mentioned separable structure of the aligning ring, a rolling bearing with a large-sized aligning ring can be easily produced with precision. Thus, the bearing of the present invention can be suitably applied to a large-sized rolling bearing such as a double-row cylindrical roller bearing for a pressure roll.

The present invention may be embodied in other specific forms without departing from the spirit or its essential characteristics. For example, the rolling bearing may be replaced by another rolling bearing other than the double-row cylindrical roller bearing.

What is claimed is:

1. A rolling bearing, comprising:
   a) a cylindrical roller bearing including:
      1) an inner ring;
      2) an outer ring having an outer periphery with a spherical portion; and
      3) rolling elements, interposed between the inner and outer rings, and arranged in a plurality of rows;
   b) an aligning ring having an imaginary axis and an inner periphery with a spherical portion conforming to the outer ring's spherical portion, and supporting and aligning with the outer ring, wherein the aligning ring includes:
      1,2) first and second annular members arranged face-to-face on opposite sides of an imaginary plane that is perpendicular to the aligning ring's axis, at a center position of the aligning ring in the aligning ring's axial direction, the first and second annular members being mutually uncoupled and separable from each other in the axial direction;
   c) a first knock pin that couples the annular members to the outer ring so as to prevent relative circumferential rotation between the annular members and the outer ring; and
   d) second and third knock pins engaging respective notches at axially outer ends of outer peripheries of the respective first and second annular members.

2. The rolling bearing of claim 1, wherein the rolling bearing rotatably supports a pressure roll.

* * * * *